(12) United States Patent
Pyun

(10) Patent No.: US 10,379,631 B2
(45) Date of Patent: Aug. 13, 2019

(54) METHOD AND DEVICE FOR TRANSMITTING/RECEIVING DATA BETWEEN WIRELESS TERMINAL AND ELECTRONIC PEN

(71) Applicant: Samsung Electronics Co., Ltd., Suwon-si, Gyeonggi-do (KR)

(72) Inventor: Dohyun Pyun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 62 days.

(21) Appl. No.: 14/333,887

(22) Filed: Jul. 17, 2014

(65) Prior Publication Data

US 2015/0022504 A1    Jan. 22, 2015

(30) Foreign Application Priority Data

Jul. 17, 2013    (KR) .......................... 10-2013-0084116

(51) Int. Cl.
*G06F 3/0354*    (2013.01)
*G06F 3/0488*    (2013.01)
*G06F 3/041*     (2006.01)

(52) U.S. Cl.
CPC ........ *G06F 3/03545* (2013.01); *G06F 3/0416* (2013.01); *G06F 3/04883* (2013.01)

(58) Field of Classification Search
None
See application file for complete search history.

(56) References Cited

U.S. PATENT DOCUMENTS

| | | | |
|---|---|---|---|
| 6,002,387 A * | 12/1999 | Ronkka | G06F 3/0488 345/157 |
| 7,165,213 B1 * | 1/2007 | Busey | H04L 12/1813 709/202 |
| 8,212,820 B2 | 7/2012 | Shimura et al. | |
| 2004/0199602 A1 * | 10/2004 | Miyakoshi | G06F 3/03545 709/217 |
| 2005/0275636 A1 * | 12/2005 | Dehlin | G06F 3/011 345/173 |
| 2006/0026653 A1 * | 2/2006 | Matsunami | H04H 20/40 725/81 |
| 2011/0163944 A1 * | 7/2011 | Bilbrey | G01D 21/02 345/156 |
| 2011/0190052 A1 * | 8/2011 | Takeda | A63F 13/02 463/31 |

(Continued)

FOREIGN PATENT DOCUMENTS

JP        2003-177864 A    6/2003
KR    10-2014-0016050 A    2/2014

*Primary Examiner* — William Boddie
*Assistant Examiner* — Bipin Gyawali
(74) *Attorney, Agent, or Firm* — Jefferson IP Law, LLP

(57) ABSTRACT

A method and a device for transmitting/receiving data between a wireless terminal and an electronic pen by recognizing a user's motion are provided. The method includes displaying a transmission list that is to be transmitted when data transmission to the electronic pen is requested after an approach of the electronic pen is detected, configuring data selected from displayed data in the transmission list as transmission data when a selection request signal is detected, and transmitting the configured transmission data to the electronic pen when transmission of the configured transmission data is requested.

16 Claims, 8 Drawing Sheets

(56) References Cited

U.S. PATENT DOCUMENTS

| | | | |
|---|---|---|---|
| 2011/0294417 A1* | 12/2011 | Mine | G06F 3/03545 455/41.1 |
| 2011/0294426 A1* | 12/2011 | Matsubara | H04N 7/141 455/41.2 |
| 2013/0091238 A1* | 4/2013 | Liu | H04W 76/10 709/217 |
| 2013/0109310 A1* | 5/2013 | Mine | G06F 3/0488 455/41.1 |
| 2013/0154956 A1* | 6/2013 | Tudosoiu | G06F 3/03545 345/173 |
| 2013/0203353 A1* | 8/2013 | Kim | H04B 7/24 455/41.2 |
| 2014/0028598 A1* | 1/2014 | Yoo | G06F 3/04883 345/173 |
| 2014/0256250 A1* | 9/2014 | Cueto | H04B 5/0031 455/41.1 |

\* cited by examiner

METHOD AND DEVICE FOR TRANSMITTING/RECEIVING DATA BETWEEN WIRELESS TERMINAL AND ELECTRONIC PEN

CROSS-REFERENCE TO RELATED APPLICATION(S)

This application claims the benefit under 35 U.S.C. § 119(a) of a Korean patent application filed on Jul. 17, 2013 in the Korean Intellectual Property Office and assign Serial No. 10-2013-0084116, the entire disclosure of which is hereby incorporated by reference.

TECHNICAL FIELD

The present disclosure relates to a method and a device for transmitting/receiving data between a wireless terminal and an electronic pen. More particularly, the present disclosure relates to a method and a device for transmitting/receiving data by recognizing a user's motion between a wireless terminal and an electronic pen.

BACKGROUND

In general, wireless terminals use various types of wireless communication including a Third Generation (3G) network, Wi-Fi, Bluetooth, wireless Universal Serial Bus (USB), Near Field Communication (NFC), and the like as a protocol for transmitting/receiving data. The reason for the diversification of the protocols for data transmission/reception in the wireless terminals is that there are various types of wireless terminals.

A representative example of the wireless terminals is a mobile communication terminal for performing communication in a mobile communication system. Additionally, there are various types of terminals such as a tablet computer type terminal, a Personal Digital Assistant (PDA), a notebook computer, and the like.

With the diversification of the wireless terminals, various auxiliary devices have been employed for the wireless terminals. For example, terminals, led by smart phones, are provided with an electronic pen for various functions such as drawing a picture desired by a user, capturing data used in the terminals, and the like. However, the auxiliary devices provided to the wireless terminals have not been used in diverse fields due to low availability thereof.

The number of wireless terminals using two or more types of wireless communication rather than only one wireless communication is increasing. The reason for employing several types of wireless communication is to transmit/receive data between the respective terminals. However, two wireless terminals using different types of wireless communication have to transmit/receive data therebetween with the aid of a Personal Computer (PC). Accordingly, it is troublesome to transmit/receive data between the wireless terminals using different types of wireless communication.

Furthermore, even in the case of transmitting/receiving data between wireless terminals using the same type of wireless communication, data transmission/reception is not easy. For example, when transmitting/receiving data between two wireless terminals using a particular type of wireless communication, a user searches a directory or folder storing the desired data in the wireless terminal which is to transmit data, and selects files to transmit. In addition, the user can transmit data only through synchronization and a transmission request between the wireless terminal to receive data and the wireless terminal to transmit data.

Accordingly, the user has to pass through a number of complicated steps so as to transmit/receive data between the wireless terminals.

The above information is presented as background information only to assist with an understanding of the present disclosure. No determination has been made, and no assertion is made, as to whether any of the above might be applicable as prior art with regard to the present disclosure

SUMMARY

Aspects of the present disclosure are to address at least the above-mentioned problems and/or disadvantages and to provide at least the advantages described below. Accordingly, an aspect of the present disclosure is to provide a method and a device which can easily achieve data transmission/reception in a wireless terminal.

Another aspect of the present disclosure is to provide a method and a device which can conveniently transmit/receive data using an auxiliary device employed for a wireless terminal.

Another aspect of the present disclosure is to provide a method and a device which can transmit/receive data between a wireless terminal and an electronic pen using the electronic pen in the wireless terminal.

In accordance with an aspect of the present disclosure, a method of transmitting/receiving data to/from an electronic pen by a wireless terminal is provided. The method includes displaying a transmission list that is to be transmitted when data transmission to the electronic pen is requested after an approach of the electronic pen is detected, configuring data selected from displayed data in the transmission list as transmission data when a selection request signal is detected, and transmitting the configured transmission data to the electronic pen when transmission of the configured transmission data is requested.

The method may further include requesting reception list data stored in the electronic pen when reception of data stored in the electronic pen is requested after the approach of the electronic pen is detected, displaying the reception list data when receiving the reception list data from the electronic pen, and, when at least one piece of reception list data is selected and then requested to be received, requesting the electronic pen to transmit the selected data, and receiving the selected data.

In accordance with another aspect of the present disclosure, a wireless terminal device for transmitting/receiving data to/from an electronic pen is provided. The wireless terminal device includes a sensor unit configured to detect an approach and a key input signal of the electronic pen, an input unit configured to detect and output a touch input, a touch and drag or a key input of a user, or hovering or a hovering movement of the electronic pen, a wireless unit configured to transmit/receive data to/from the electronic pen in a frequency band, a memory configured to store data, a display unit configured to display a state of the wireless terminal device, data or a transmission data list which is to be transmitted to the electronic pen, or data or a reception data list which is to be received from the electronic pen, and a controller configured to read a transmission list, which is to be transmitted, from the memory when data transmission to the electronic pen is requested after an approach of the electronic pen is detected by the sensor unit, control the display unit to display the transmission list, configure data selected from displayed data in the transmission list as transmission data when a selection request signal is detected, and control the wireless unit to transmit the configured transmission data to the electronic pen when transmission of the configured transmission data is requested.

The controller according to the present disclosure may control the wireless unit to request reception list data stored in the electronic pen when reception of data stored in the electronic pen is requested after the approach of the electronic pen is detected through the sensor unit, receive the reception list data from the electronic pen to display the reception list data on the display unit, and when at least one of the reception list data is selected and then requested to be received, control the wireless unit to request the electronic pen to transmit the selected data and to receive the selected data.

In accordance with another aspect of the present disclosure, an electronic pen device for transmitting/receiving data to/from a wireless terminal is provided. The electronic pen device includes a sensor unit configured to provide an approach of the electronic pen to the wireless terminal and a key input signal of the electronic pen, a key input unit configured to detect a key input signal of a user, a wireless unit configured to transmit/receive data to/from the wireless terminal in a frequency band, a memory configured to store data, and a controller configured to generate list data stored in the memory when the wireless terminal requests a list of the data in the memory, control the wireless unit to transmit the generated list data to the wireless terminal, and, when at least one of the list data is requested to be transmitted, control the wireless unit to transmit the data requested to be transmitted to the wireless terminal.

As described above, according to the present disclosure, a user can transmit/receive data through a simple manipulation without complicated transmission procedures. That is, the user can easily transmit data through simple manipulations of the wireless terminal and the electronic device. Furthermore, the user can transmit/receive data intuitively and more conveniently and rapidly.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
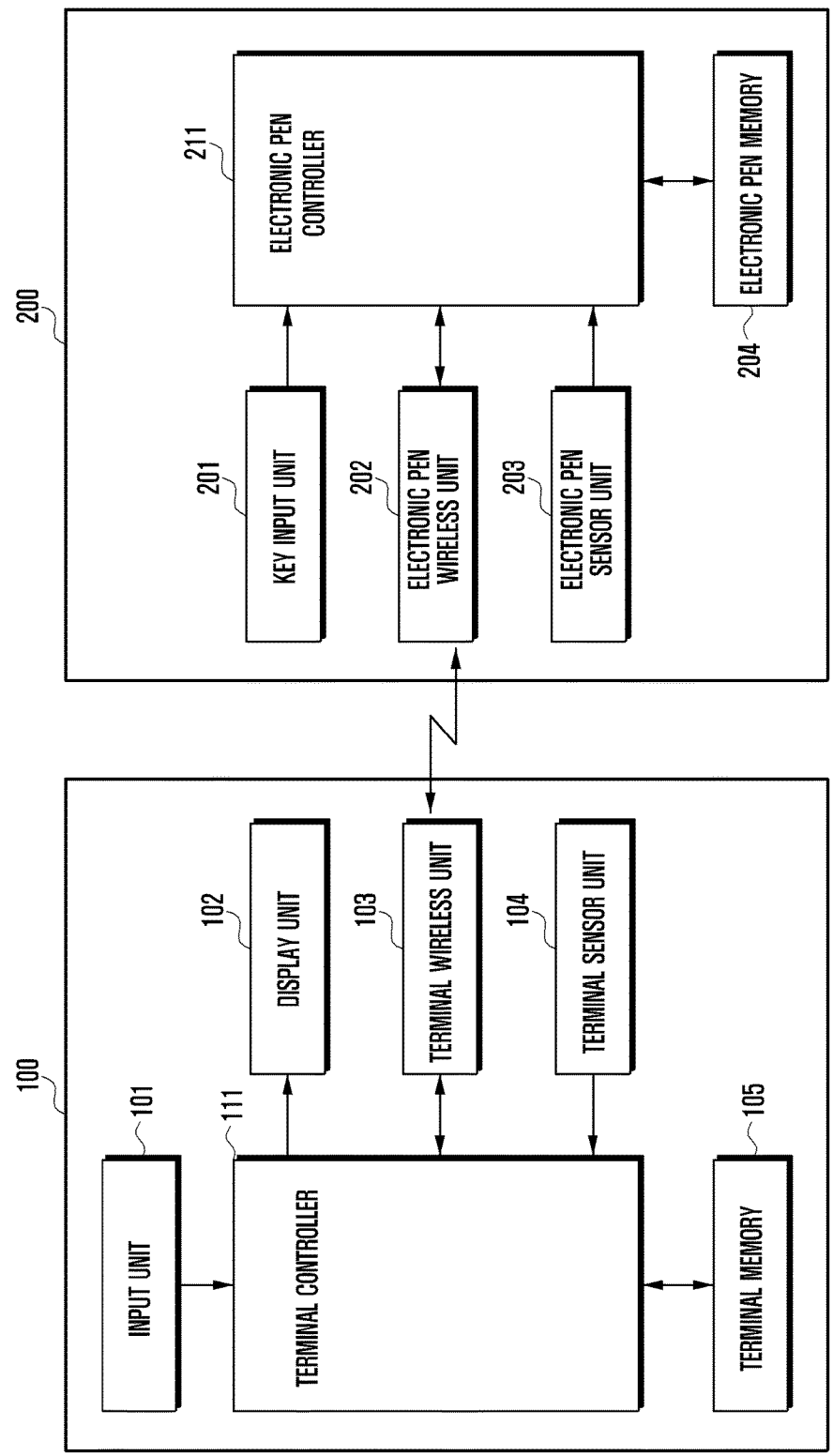
FIG. 1 is a block diagram illustrating a configuration of internal function blocks of a wireless terminal and an electronic pen according to an embodiment of the present disclosure.

FIG. 1 is a block diagram illustrating a configuration of internal function blocks of a wireless terminal and an electronic pen according to an embodiment of the present disclosure.

Referring to FIG. 1, a wireless terminal 100 may be a wireless terminal that can communicate with an electronic pen 200. Furthermore, the wireless terminal 100 may also communicate with other devices or a network in addition to the electronic pen 200. The wireless terminal according to various embodiments of the present disclosure may be a desktop Personal Computer (PC), a laptop PC, a Personal Digital Assistant (PDA), a Portable Multimedia Player (PMP), a tablet PC, a mobile phone, a video phone, a feature phone, a smart phone, an electronic book reader, a digital camera, a wearable device, a wireless device, a Global Positioning System (GPS) receiver, a hand-held device, an MP3 player, a camcorder, a game console, an electronic watch, a flat panel device, an electronic photograph, an electronic board, an electronic sign board, a projector, a navigation device, a black box, a set-top box, an electronic dictionary, a refrigerator, an air conditioner, a vacuum cleaner, an artificial intelligence robot, a TeleVision (TV), a Digital Versatile Disk (DVD) player, an audio, an oven, a microwave oven, a washing machine, an air cleaner, a medical device, a vehicle device, a shipbuilding device, an aircraft device, a security device, agricultural, livestock and fishery equipment, electronic clothing, an electronic key, an electronic bracelet, an electronic necklace, or the like. For example, the electronic devices may be driven by various operating systems such as Android, iOS, Windows, Linux, Symbian, Tizen, and Bada. It should be apparent to those skilled in the art that the electronic devices and the operating system according to various embodiments of the present disclosure are not limited to the above-described examples.

First, the configuration of function blocks of the wireless terminal 100 according to the present disclosure will be described. The wireless terminal 100 may include an input unit 101, a display unit 102, a terminal wireless unit 103, a terminal sensor unit 104, a terminal memory 105, and a terminal controller 111.

The input unit 101 may include a keypad (not illustrated) for generating a key signal corresponding to a key input by a user and a touch input unit (not illustrated) that can detect the user's touch input. The input unit 101 provides the terminal controller 111 with the key input signal when the key is input and coordinates of the touch input when the touch input is detected. At this time, the touch input may be one simple touch, a touch and drag, hovering, a hovering movement, or the like. If the touch and drag or the hovering movement is input, the input unit 101 may provide input coordinates and coordinates corresponding to a moving path to the terminal controller 111.

The display unit 102 includes a visual display unit (not illustrated), an auditory display unit (not illustrated), and a tactile display unit (not illustrated). The visual display unit may be various types of display devices such as a Liquid Crystal Display (LCD), a Light Emitting Diode (LED), an Organic Light Emitting Diode (OLED), and the like, and converts data provided from the terminal controller 111 into visual information which a user can visually recognize to display the converted visual information. Furthermore, the display unit 102 may display data required for data transmission or reception according to the present disclosure. The auditory display unit may be configured with a speaker, and outputs a sound which a user can recognize. Moreover, the tactile display unit may inform a user of a current state or a change of the state in a tactile manner through a vibration.

Based on the communication scheme, the terminal wireless unit 103 encodes and modulates data required to be transmitted by terminal controller 111, up-converts the modulated data into the configured frequency band, and transmits the up-converted data through an antenna (not illustrated). Furthermore, the terminal wireless unit 103 down-converts data received from the electronic pen 200 through the antenna, demodulates and decodes the down-converted data, and provides the decoded data to the terminal controller 111.

The terminal sensor unit 104 may detect an approach of the electronic pen 200 and an approach speed thereof, and detect a key input signal of a key input unit 201 added to the electronic pen 200 to provide the detected key input signal to the terminal controller 111. Here, the approaching speed of the electronic pen 200 includes both a speed at which the electronic pen 200 approaches the wireless terminal 100 and a speed at which the electronic pen 200 moves away from the wireless terminal 100. Furthermore, the terminal sensor unit 104 may use two or more sensors when it is difficult to detect the aforementioned operation through one sensor. For example, the terminal sensor unit 104 may use a sensor for detecting contact, a sensor for detecting a distance, for example, hovering, and a sensor for detecting a predetermined degree of long distance range in which hovering is not detected. Moreover, a camera module may be included in the wireless terminal 100 if necessary, and the terminal sensor unit 104 may additionally use information obtained by the camera.

The terminal memory 105 may include an area for temporarily storing operating system data for driving the terminal 100, data required for a control operation of the terminal controller 111, and data generated during the control operation, and more particularly, includes an area for storing control data for data transmission/reception between the terminal 100 and the electronic pen 200 in accordance with the present disclosure. Furthermore, the terminal memory 105 may include an area for storing arbitrary user data.

The electronic pen 200 may include the key input unit 201, an electronic pen wireless unit 202, an electronic pen sensor unit 203, an electronic pen memory 204, and an electronic pen controller 211.

The key input unit 201 generates a key input signal corresponding to a user's action of pressing a key and a key release signal corresponding to the user's action of pressing a key before releasing it, and provides the generated signals to the electronic pen controller 211.

Based on the communication scheme, the electronic pen wireless unit 202 encodes and modulates data required to be transmitted by electronic pen controller 211, up-converts the modulated data into the configured frequency band, and transmits the up-converted data through an antenna (not illustrated). Furthermore, the electronic pen wireless unit 202 down-converts data received from the wireless terminal 100 through the antenna, demodulates and decodes the down-converted data, and provides the decoded data to the electronic pen controller 211.

The electronic pen sensor unit 203 performs a required operation so that the terminal 100 may sense an approach between the terminal 100 and the electronic pen 200 and an approach speed. The electronic pen sensor unit 203 may have a configuration for generating and transmitting a signal such that the terminal sensor unit 104 may detect an approach, a movement, and/or a release of the electronic pen 200, or may have a configuration such as a coil for allowing the electronic pen sensor unit 203 to detect the approach, the movement, and/or the release thereof. Namely, the electronic pen sensor unit 203 has only to have a configuration for allowing the terminal sensor unit 104 of the wireless terminal 100 to detect the approach, the movement, and the release of the electronic pen.

The electronic pen memory 204 may include an area for storing data provided from the wireless terminal 100, and may store (e.g., record, write), delete, overwrite, update, and move data under the control of the electronic pen controller 211.

The electronic pen controller 211 may perform a control required for data transmission/reception with the wireless terminal 100, and may perform a control to store, delete, overwrite, update, and move data.

Hereinafter, data transmission/reception between the wireless terminal 100 and the electronic pen 200 having the above-described configuration will be described with reference to the accompanying drawings.

Figure 2:
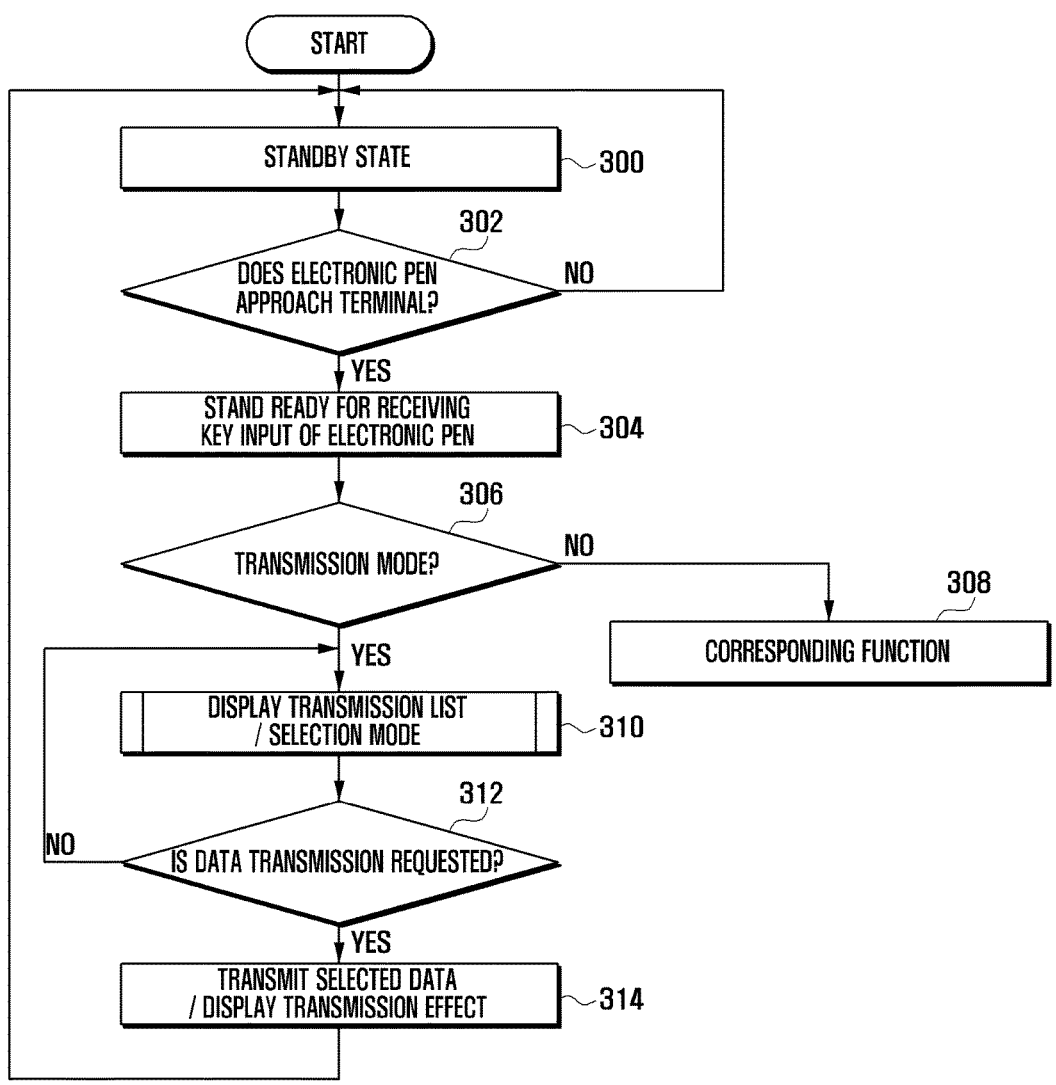
FIG. 2 is a flowchart illustrating a control flow in a case of transmitting data from the wireless terminal to the electronic pen according to an embodiment of the present disclosure.

FIG. 2 is a flowchart illustrating a control flow in a case of transmitting data from the wireless terminal to the electronic pen according to an embodiment of the present disclosure.

Referring to FIG. 2, the terminal controller 111 of the wireless terminal 100 is maintained in a standby state in operation 300. Here, the standby state implies a step for standing ready for reception of a specific user input, determining whether it is time to perform an event, for example, an alarm event, or determining whether the electronic pen 200 approaches the wireless terminal 100 in accordance with the present disclosure. In addition to that, the standby state may include a state of standing ready for occurrence of several different operations depending on a type of the wireless terminal 100. For example, in a case where the wireless terminal 100 is a smart phone, such operations may include reception of a message or a call, or a user's demand for transmitting a message or a call.

In operation 302, the terminal controller 111 determines whether the electronic pen 200 approaches the wireless terminal 100. As an example of operation 302, the terminal controller 111 may determine whether a signal for an approach of the electronic pen 200 is received from the terminal sensor unit 104. As a result of the determination in operation 302, if the approach of the electronic pen 200 is detected, the terminal controller 111 proceeds to operation 304. Meanwhile, as the result of the determination in operation 302, if the approach of the electronic pen 200 is not detected, the terminal controller 111 is maintained in the standby state in operation 300. Since FIG. 2 is a flowchart illustrating operations in which the electronic pen 200 approaches the wireless terminal 100 and the wireless terminal 100 transmits data stored therein to the electronic pen 200, other cases except for determining the approach of the electronic pen 200 in operation 302 will not be described.

The terminal controller 111 proceeds to operation 304 to stand ready for receiving an input of a key added to the electronic pen 200. At this time, the input of the key added to the electronic pen 200 may correspond to requesting transmission of specific data stored in the wireless terminal 100 or transmitting data stored in the electronic pen 200 to the wireless terminal 100. The terminal controller 111 proceeds from operation 304 to operation 306 to determine whether a transmission mode is requested. Namely, when an input of the key attached to the electronic pen 200 is detected, data transmission from the wireless terminal 100 to the electronic pen 200 is requested by the electronic pen 200. More specifically, the terminal controller 111 may display data transmission from the wireless terminal 100 to the electronic pen 200 and data transmission from the electronic pen 200 to the wireless terminal 100 on the display unit 102, and may allow a user to select one of the displayed contents. Namely, when a key input signal of the electronic pen through the key input unit 201 of the electronic pen 200 is detected, the terminal controller 111 determines whether the wireless terminal 100 enters a reception mode or transmission mode. The reception and transmission modes may be displayed in an icon form such that a user may intuitively recognize them, and may be selected by the user.

As a result of the determination in operation 306, if the key attached to the electronic pen 200 is input and the data transmission to the electronic pen 200 is requested, the terminal controller 111 proceeds to operation 310, and if not, the terminal controller 111 proceeds to operation 308 to perform a corresponding function. As mentioned above, the specific data is transmitted from the wireless terminal 100 to the electronic pen 200 in FIG. 2 and thus, other operations except for transmitting data from the wireless terminal 100 to the electronic pen 200 will not be described.

In operation 310, the terminal controller 111 may display, on the display unit 102, a list of data that is stored in the terminal memory 105 and may be transmitted to the electronic pen 200, and may display files on the display unit 102 such that a user may select one or more files displayed on the display unit 102. This will be described with reference to the accompanying FIG. 3.

Figure 3:
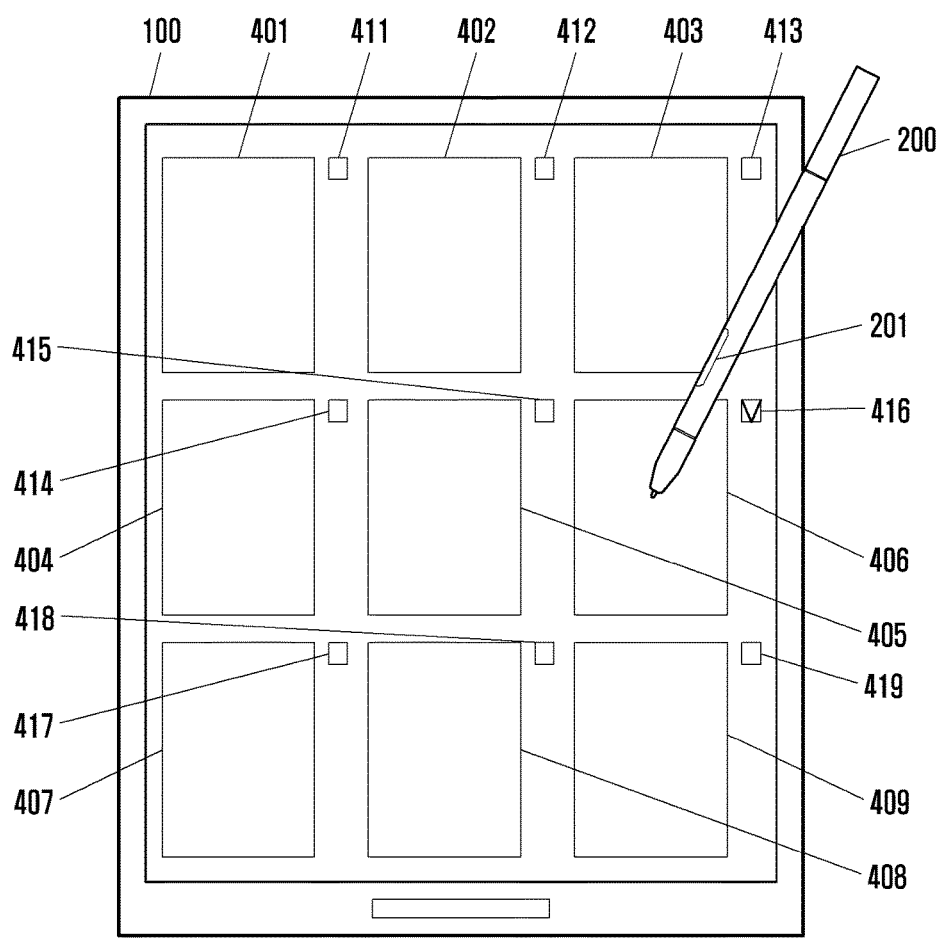
FIG. 3 illustrates an example of a state in which a list of data that is to be transmitted to the electronic pen from the wireless terminal is displayed on a display unit according to an embodiment of the present disclosure.

FIG. 3 illustrates an example of a state in which a list of data that is to be transmitted to the electronic pen from the wireless terminal is displayed on the display unit according to the present disclosure.

Referring to FIG. 3, files 401 to 409 that may be selected by the electronic pen 200, namely, files that may be transmitted to the electronic pen 200 are displayed on the display unit 102 of the wireless terminal 100.

Only one file may be displayed on the display unit 102 of the wireless terminal 100, or two or more files may be displayed on the display unit 102 as illustrated in FIG. 3. Each of the files may also be displayed in a preview or all-view format. It is assumed in FIG. 3 that nine files 401 to 409 are displayed. Further, selection display windows 411 to 419 for informing whether the respective files are selected or not are displayed on an upper right side of the respective files. The selection display windows 411 to 419 may be displayed as illustrated in FIG. 3, and every time a specific file is selected from the files 401 to 409, the corresponding file's boundary line may change in color or may be displayed in a format embossed towards the user, that is, in a forward direction of the display unit 102 in cases where a three dimensional image can be displayed. It is apparent to those skilled in the art that various formats for informing the user that the specific file has been selected from the displayed files may be used in addition those described above.

FIG. 3 illustrates a case in which the rightmost file 406 in the second row has been selected. Accordingly, it can be seen that a "v" mark is displayed in the selection display window 416 of the selected file 406. Furthermore, in a case of additionally selecting another file, the "v" making for informing that the other file has been selected may be displayed in the selection display window of the corresponding file. In a case of informing a user of the file selection through a different method other than using the "v" mark, the corresponding form may be used for informing the user of the file selection.

When displaying files stored in the terminal memory 105 on the display unit 102, the terminal controller 111 may diversely change the number of files to be displayed. For example, it is assumed that a specific folder which contains more files than can be displayed on the display unit 102 at one time is selected. At this time, it is not easy to display all of the files on the display unit 102 through the preview format, and it is also not easy for a user to recognize the files even though the files are displayed through the preview format. Accordingly, a preconfigured or a user-selected number of files may be selected. For example, a user or manufacturer may configure in advance the number of files to be displayed on the display unit 102. In this way, the number of files to be displayed through the preview format is as many as a user may visually recognize depending on the size of the display unit 102. Thus, nine files may be configured to be displayed as illustrated in FIG. 3, and it is desirable to display as many files as a user may recognize through the preview format, for example, four files, sixteen files, etc. In addition, the number of files to be displayed through the preview format may also be changed even while the files are being displayed.

Furthermore, in a case where files that cannot be displayed at one time are stored in one specific folder, the files that are not displayed may be displayed through the preview format. For example, the files that are not currently displayed may be displayed on the display unit 102 by touching a right or left side of the display unit 102 with a hand or electronic pen and then dragging the touch to an opposite side, namely, leftward or rightward. At this time, assuming that files subsequent to the first displayed files are displayed by dragging the touch from right to left, the previously displayed files may be displayed by dragging the touch in an opposite direction. It is natural that the reverse may also be possible.

Further, in a case where only one file or a smaller number of files than the maximum display number are displayed in a specific folder, all or some of the files corresponding to the optimal number of files that can be displayed on the display unit 102 may also be displayed.

Referring again to FIG. 2, the files are displayed on the display unit 102 in such a way, and a user may search for and/or select a specific file using the electronic pen 200 in operation 310. While being in the display and selection mode, the terminal controller 111 determines whether the data of the wireless terminal 100 is requested to be transmitted to the electronic pen 200, by using the signal received from the terminal sensor unit 104 in operation 312.

Here, the requesting of the data of the wireless terminal 100 to be transmitted to the electronic pen 200 by using the signal received from the terminal sensor unit 104 may correspond to a case in which the electronic pen 200 rapidly moves away from the wireless terminal 100. That is, when the electronic pen 200 rapidly moves away from the wireless terminal 100, the terminal sensor unit 104 of the wireless terminal 100 may detect that the electronic pen 200 moves away from the terminal and at the same time, may calculate a speed and acceleration according to time using information on a separation distance between the wireless terminal 100 and the electronic pen 200. A process of calculating the speed and the acceleration using the distance and/or the time by which the electronic pen 200 moves away from the wireless terminal 100 will be described below.

First, it is assumed that the electronic pen 200 is spaced a predetermined distance apart from the wireless terminal 100 in units of time. That is, it is assumed that the electronic pen 200 is touching or hovering over the wireless terminal 100 at a time point of t0. It is assumed that the electronic pen 200 is spaced apart from the wireless terminal 100 by distances of d1, d2, d3, and d4 at times t1, t2, t3, and t4, respectively, and the terminal sensor unit 104 detects these values.

The terminal controller 111 may recognize the separation distance according to the time points from the terminal sensor unit 104, and may calculate the speed by which the electronic pen 200 moves away from the wireless terminal 100. That is, assuming that a speed at t2 is v1, a speed at t3 is v2, and a speed at t4 is v3, the respective speeds may be calculated by Equation 1 below.

$$v1 = \frac{(d2-d1)}{t}$$
$$v2 = \frac{(d3-d2)}{t}$$
$$v3 = \frac{(d4-d3)}{t}$$

Equation 1

Furthermore, assuming that instantaneous acceleration at t3 and t4 corresponds to a1 and a2, respectively, a1 and a2 may be calculated by Equation 2 below using Equation 1.

$$a1 = \lim_{\Delta t \to 0} \frac{(v2-v1)}{t}$$
$$a2 = \lim_{\Delta t \to 0} \frac{(v3-v2)}{t}$$

Equation 2

The operation in which the electronic pen 200 moves away from the wireless terminal 100 may be detected using the values calculated by Equation 1 and Equation 2. Here, the times t1, t2, t3, and t4 have to be configured to be short intervals and may be configured as a value obtained by several experiments. Namely, the time required for the operation in which the electronic pen 200 moves away from the wireless terminal and the moving distance corresponding to the time may be calculated and identified.

Furthermore, the values calculated by Equation 1 and Equation 2 are used for recognition of the operation in which the electronic pen 200 moves away from the wireless terminal 100. When v1, v2, and v3 calculated by Equation 1 is larger than zero and a1 and a2 calculated by Equation 2 are larger than a threshold value, the operation in which the electronic pen 200 moves away from the wireless terminal 100 is recognized. This implies that the electronic pen 200 moves away from the wireless terminal 100 for a period of time, the velocity of the electronic pen 200 is continuously increased, and the instantaneous velocity of the electronic pen 200 is larger than the threshold value for a specific period of time.

Moreover, the operation in which the electronic pen 200 moves away from the wireless terminal 100 may be similar to an operation of collecting a liquid using a pipette used in scientific experiments.

In operation 312, the terminal controller 111 may determine whether transmission of the data selected in operation 310 is requested, through the aforementioned calculation. As a result of the determination in operation 312, if the transmission of the selected data is requested, the terminal controller 111 proceeds to operation 314, and if not, the terminal controller 111 continuously performs operation 310.

When proceeding from operation 312 to operation 314, the terminal controller 111 controls the terminal wireless unit 103 to transmit the selected data to the electronic pen 200. Furthermore, in operation 314, the terminal controller 111 displays a transmission effect on the display unit 102. A method of displaying the transmission effect will be described with reference to the accompanying FIGS. 4A and 4B.

Figure 4A:
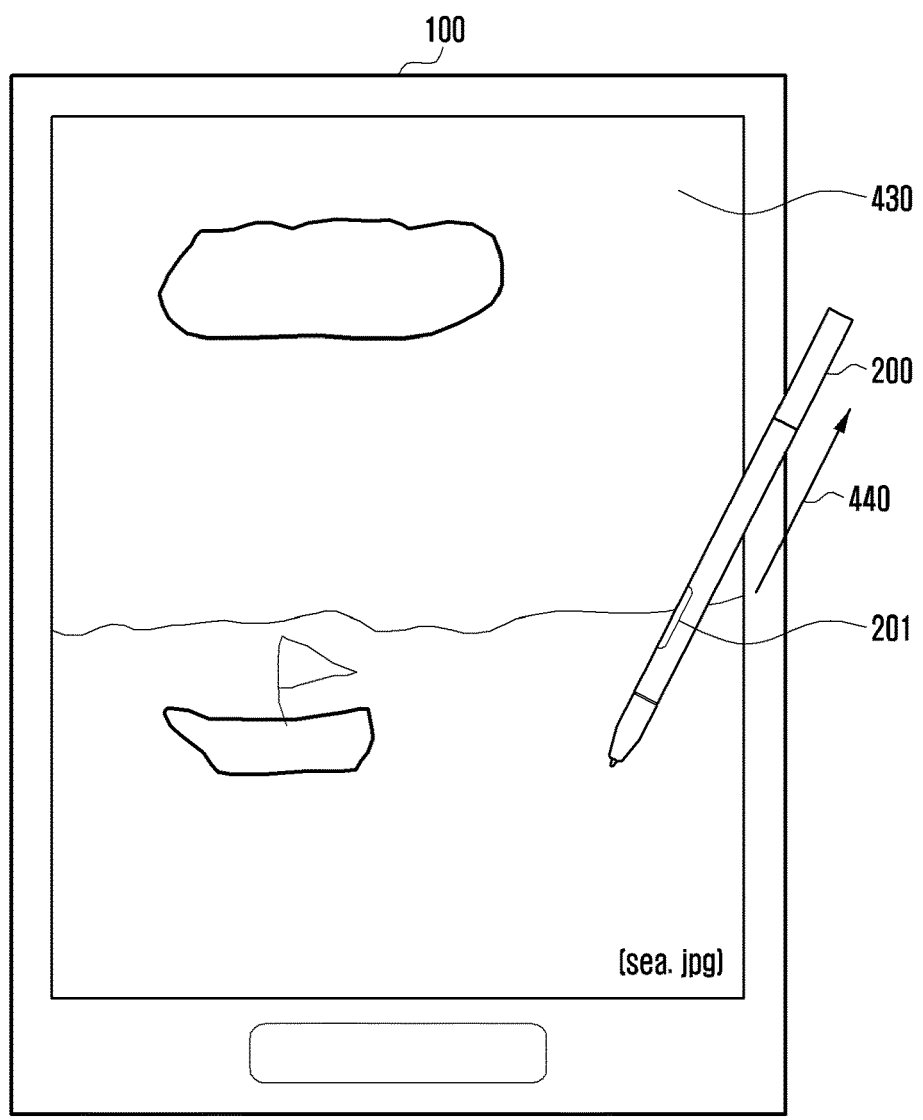
FIGS. 4A and 4B illustrate an example of a case of selecting specific data to be transmitted from the wireless terminal to the electronic pen and transmitting the selected data to the electronic pen according to an embodiment of the present disclosure.
Figure 4B:
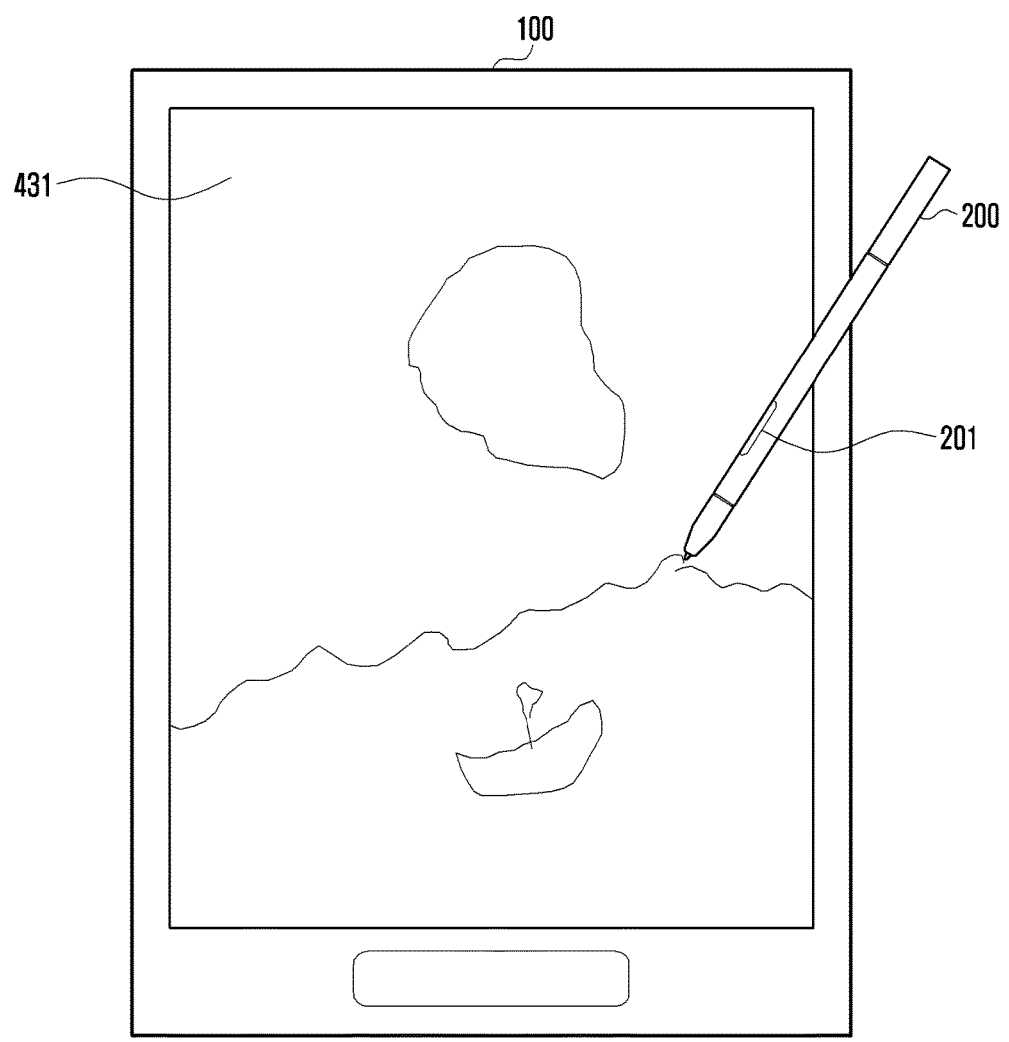

FIGS. 4A and 4B illustrate an example of a case of selecting a specific data to be transmitted from the wireless terminal to the electronic pen and transmitting the selected data to the electronic pen.

Referring to FIG. 4A, the wireless terminal 100 displays an image file 430 (e.g., sea.jpg) on the display unit 102. As illustrated in FIG. 4A, the wireless terminal 100 may display the name and the type of the file 430 displayed on the display unit 102, and may provide the file 430 in an all-view or preview format. Furthermore, the wireless terminal 100 may also display only the file name and type of data or only image information, namely, a picture.

An overall operation of moving the data stored in the wireless terminal 100 to the electronic pen 200 will be described prior to a description of an effect. It is assumed that the wireless terminal 100 displays a file on the display unit 102 and the electronic pen 200 approaches the wireless terminal 100 to be in a hovering state or in contact with the wireless terminal 100. Furthermore, it is assumed that the corresponding file has been selected. Namely, it is assumed that the electronic pen has approached the wireless terminal as in operation 302 of FIG. 2, an input has been received through the key 201 of the electronic pen as in operation 304, the wireless terminal has entered the transmission mode based on the determination result as in operation 306, and a specific file, namely, a currently displayed file has been selected as in operation 310.

In such a state as described above, a user spaces the electronic pen 200 apart from the wireless terminal 100 by a distance to request data transmission. An arrow, indicated by reference numeral 440, for representing the state in which the electronic pen 200 is spaced apart from the wireless terminal 100 is illustrated in FIG. 4A for a description of the aforementioned operation. When the electronic pen 200 is spaced apart from the wireless terminal 100 as described above, the wireless terminal 100 may detect that the electronic pen 200 is spaced apart from the terminal, as in Equation 1 and Equation 2.

The operation in which the electronic pen 200 is spaced apart from the wireless terminal 100 may be similar to an operation of collecting a liquid using a pipette used in laboratories. In operation 312, the wireless terminal 100 recognizes that the data transmission has been requested.

Accordingly, the wireless terminal 100 proceeds to operation 314 to transmit the selected data and display a transmission effect. The displaying of the transmission effect of the selected data may be performed as illustrated in FIG. 4B.

Referring to FIG. 4B, the selected file 430 in FIG. 4a has a modified form 431 as if the file 430 is sucked into an acute end portion of the electronic pen 200. This is aimed at intuitively informing a user of starting and ending of the data transmission through the modified form as if the file is sucked into the electronic pen while the data is being transmitted. That is, the modified form 431 of the file in FIG. 4B is not a fixed form but a variable form in which the file continuously disappears on the display unit 102 in correspondence to the amount of the transmitted data, and a degree that the file is sucked into the electronic pen 200 is increasingly intensified. Accordingly, when the wireless terminal 100 starts to transmit the data, the degree that the file is sucked into the electronic pen 200 is increasingly intensified, with some of the displayed data being distorted. The distortion of the data is increasingly intensified as the data is transmitted from the wireless terminal 100 to the electronic pen 200. Thereafter, when the data is completely transmitted from the wireless terminal 100 to the electronic pen 200, no data is displayed on the display unit 102 of the wireless terminal 100.

Furthermore, at this time, the wireless terminal 100 may provide a sound if necessary. For example, the wireless terminal 100 may be configured to output a sound that is made when a liquid is sucked into a pipette or a sound that is made when a person drinks a beverage.

Next, a case of transmitting the data stored in the electronic pen 200 to the wireless terminal 100 according to the present disclosure will be described with reference to FIG. 5.

Figure 5:
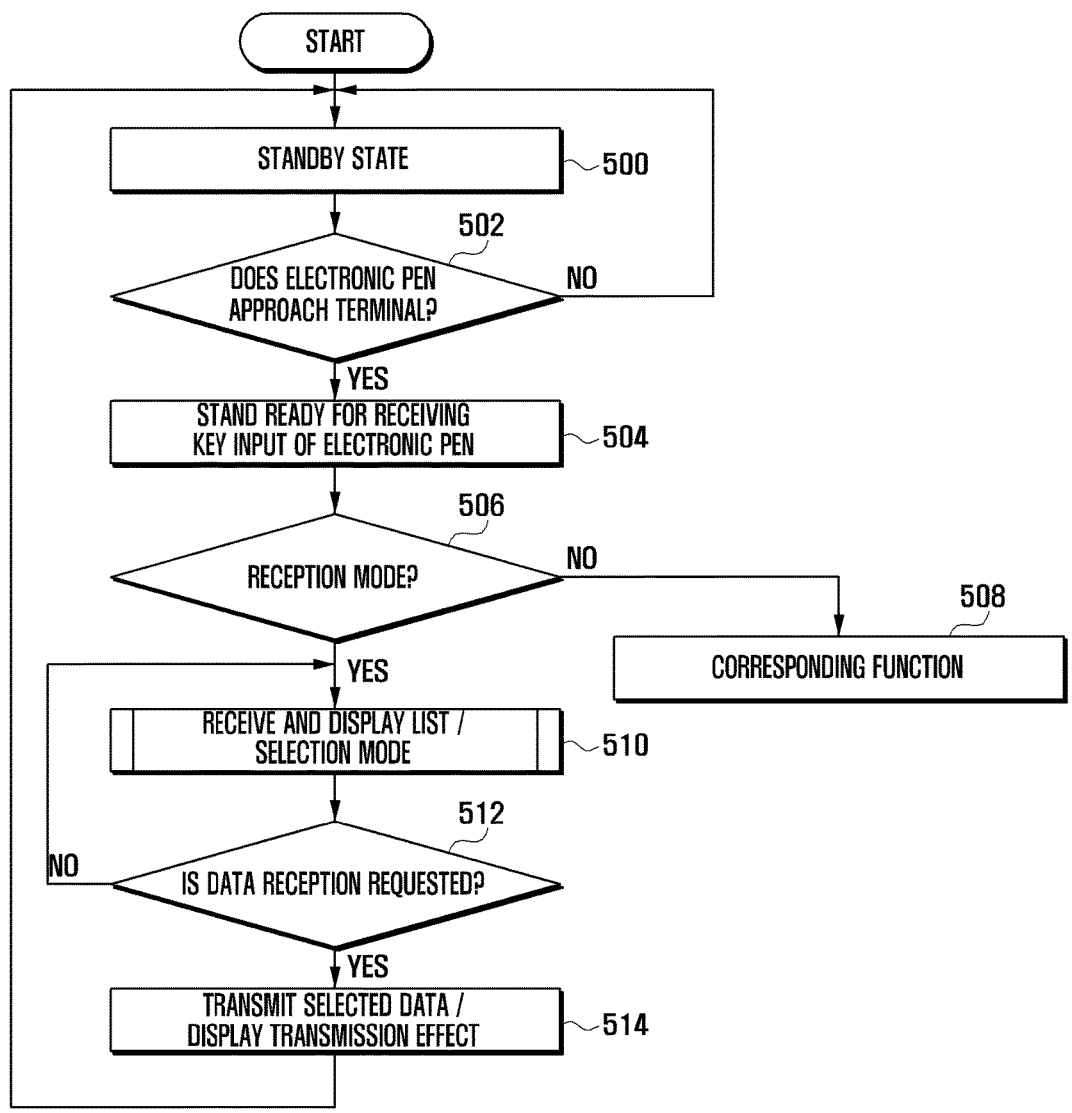
FIG. 5 is a flowchart illustrating a control flow in a case where the wireless terminal receives data stored in the electronic pen according to an embodiment of the present disclosure.

FIG. 5 is a flowchart illustrating a control flow in a case where the wireless terminal receives data stored in the electronic pen according to the present disclosure.

Referring to FIG. 5, the terminal controller 111 is maintained in a standby state in operation 500. Here, the standby state implies a step for standing ready for reception of a specific user input, determining whether it is time to perform an event, for example, an alarm event, or determining whether the electronic pen 200 approaches the wireless terminal 100 in accordance with the present disclosure. In addition to that, the standby state may include a state of standing ready for occurrence of several different operations depending on a type of the wireless terminal 100. For example, in a case where the wireless terminal 100 is a smart phone, such operations may include reception of a message or a call, a user's demand for transmitting a message or a call, or the like.

The terminal controller 111 proceeds to operation to determine whether the electronic pen 200 approaches the wireless terminal 100. As an example of operation 502, the terminal controller 111 may determine whether a signal for an approach of the electronic pen 200 is received from the terminal sensor unit 104. As a result of the determination in operation 502, if the approach of the electronic pen 200 is detected, the terminal controller 111 proceeds to operation 504. Meanwhile, as the result of the determination in operation 502, if the approach of the electronic pen 200 is not detected, the terminal controller 111 is maintained in the standby state of operation 500. Since FIG. 5 is a flowchart illustrating operations in which the electronic pen 200 approaches the wireless terminal 100 to transmit data stored therein to the wireless terminal 100, other cases except for determining the approach of the electronic pen 200 in operation 502 will not be described.

The terminal controller 111 proceeds to operation 504 to stand ready for receiving an input of a key added to the electronic pen 200. At this time, the input of the key added to the electronic pen 200 may correspond to requesting transmission of specific data stored in the wireless terminal 100 or transmitting data stored in the electronic pen 200 to the wireless terminal 100. The terminal controller 111 proceeds from operation 504 to operation 506 to determine whether a reception mode is requested. Namely, when an input of the key attached to the electronic pen 200 is detected, data transmission from the electronic pen 200 to the wireless terminal 100 is requested by the electronic pen 200. More specifically, the terminal controller 111 may display data transmission from the wireless terminal 100 to the electronic pen 200 and data transmission from the electronic pen 200 to the wireless terminal 100 on the display unit 102, and may allow a user to select one of the displayed contents. Namely, when a key input signal of the electronic pen through the key input unit 201 of the electronic pen 200 is detected, the terminal controller determines whether the wireless terminal 100 enters a reception mode or transmission mode. The reception and transmission modes may be displayed in an icon form such that a user may intuitively recognize them, and may be selected by the user.

As a result of the determination in operation 506, if the key attached to the electronic pen 200 is input and the reception mode is requested for the electronic pen 200, the terminal controller 111 proceeds to operation 510, and if not, the terminal controller 111 proceeds to operation 508 to perform a corresponding function. As mentioned above, the specific data is transmitted from the electronic pen 200 to the wireless terminal 100 in FIG. 5 and thus, other operations except for transmitting data from the electronic pen 200 to the wireless terminal 100 will not be described.

In operation 510, the terminal controller 111 receives the data stored in the electronic pen memory 204 from the electronic pen 200, and converts the data into a list to display the converted list. More specifically, when being in the reception mode, the terminal controller 111 may control the terminal wireless unit 103 to transmit a signal for requesting the list of the data stored in the electronic pen 200.

Accordingly, the electronic pen wireless unit 202 may receive the signal for requesting the list of the stored data, and may provide the received signal to the electronic pen controller 211. The electronic pen controller 211 reads the list of the data stored in the electronic pen memory 204 by searching the electronic pen memory 204, converts the list according to standards for transmission, provides the converted list to the electronic pen wireless unit 202, and controls the electronic pen wireless unit 202 to transmit the converted list. Therefore, the electronic pen wireless unit 202 transmits the list of the data stored in the electronic pen memory 204 to the wireless terminal 100 in a frequency band.

The terminal wireless unit 103 down-converts, demodulates, and decodes the list data received from the electronic pen 200, and provides the decoded list data to the terminal controller 111. The terminal controller 111 converts the list data received through the terminal wireless unit 103 into data that can be visually displayed for a user, and displays the converted data through the display unit 102. An example of the data displayed in such a way will be described with reference to FIG. 6.

Figure 6:
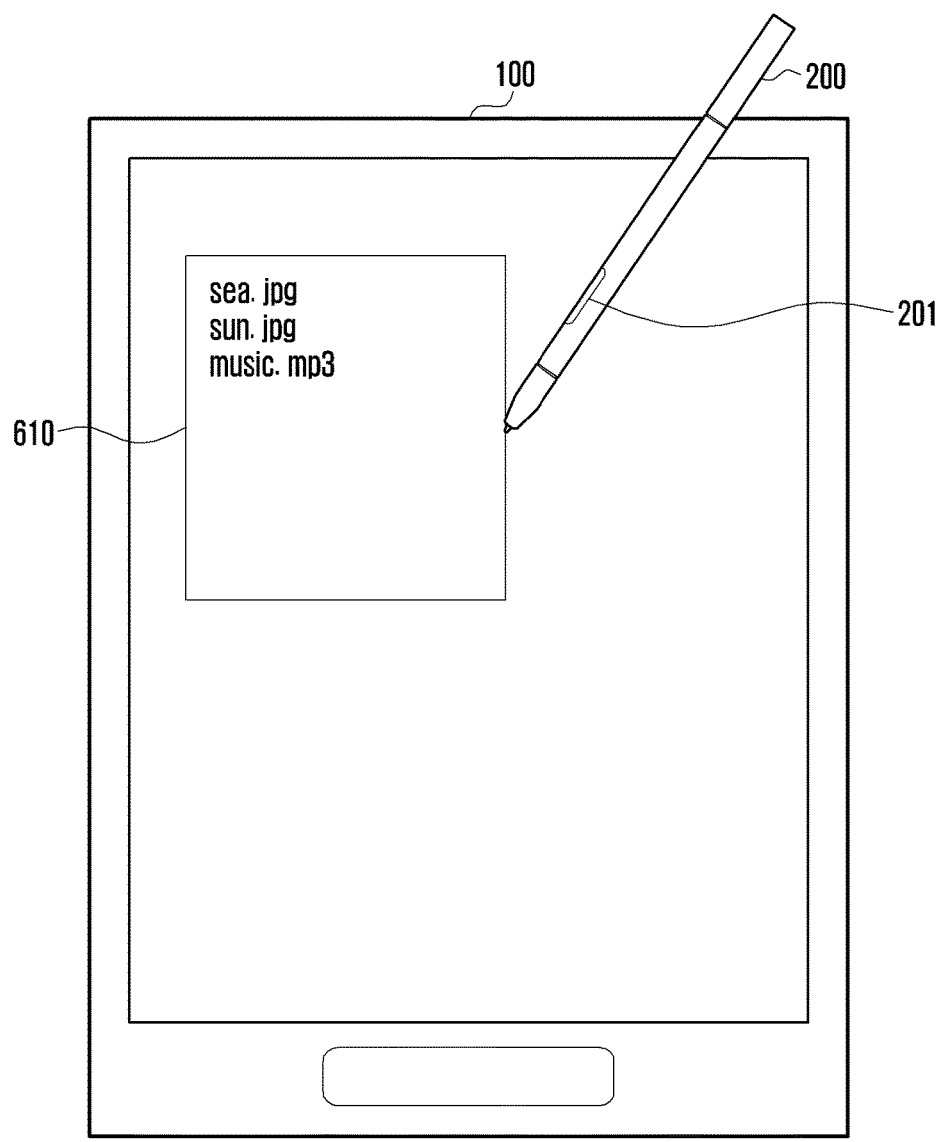
FIG. 6 illustrates an example of a state of providing and displaying a list of data stored in the electronic pen to the wireless terminal according to an embodiment of the present disclosure.

FIG. 6 illustrates an example of a state of providing and displaying a list of data stored in the electronic pen to the wireless terminal according to an embodiment of the present disclosure.

Referring to FIG. 6, the electronic pen 200 having the key 201 for detecting a press of a user and the wireless terminal 100 for displaying list data provided from the electronic pen 200 in a list display window 610 are illustrated. The list display window 610 for displaying the list data received from the electronic pen 200 may be displayed on the display unit 102 of the wireless terminal 100. A list and a file type of specific files may be displayed in the list display window 610 as illustrated in FIG. 6. In addition, when preview data is received together with the list data from the electronic pen 200, the preview data may also be displayed for a user's visual or intuitive understanding.

In the case of displaying the preview data as described above, the wireless terminal 100 may request transmission of the preview data together with the list data. In another example, in the case of transmitting the preview data, the electronic pen 200 may transmit the preview data before or on transmitting the list data so as to inform of the transmission of the preview data.

When there is a large amount of list data received from the electronic pen 200, for example, when the received list data is too much to be displayed on the display unit 102 of the wireless terminal 100 at one time, the wireless terminal 100 may display, at a lower end of the display list, that only some of the received data are displayed. In a case of displaying all list data in a page form, such a display method may have a format capable of informing which page the currently displayed page corresponds to or what percent of all display data is displayed. Furthermore, when there is a large amount of list data to be displayed, the terminal controller 111 may also temporarily store the corresponding list data in the terminal memory 105.

Accordingly, in a case where the electronic pen 200 has two or more data lists, a user may select one of them while visually identifying the displayed lists. In the method of selecting data in the displayed lists, one or more pieces of data are selected in the displayed lists through the electronic pen 200 and thus, data is determined which will be transmitted from the electronic pen 200 to the wireless terminal 100.

When the data which will be transmitted from the electronic pen 200 to the wireless terminal 100 is determined through such a process, a user may request data transmission from the electronic pen 200 to the wireless terminal 100. In order to request the data transmission from the electronic pen 200 to the wireless terminal 100, the user may maintain the electronic pen 200 at a position of the selected file for a period of time while pressing the key added to the electronic pen 200. As another method, the user may also touch an icon indicating a transmission starting position on the display unit 102. As still another method, the user may maintain the electronic pen 200 at a position of the selected file for a period of time while pressing the key added to the electronic pen 200 and thereafter, may release the key input.

Any of the aforementioned methods may be configured as an operation for the data transmission from the electronic pen 200 to the wireless terminal 100, and two or more methods may also be used together.

Referring again to FIG. 5, when using one of the aforementioned methods, the terminal controller 111 determines whether data reception is requested from the electronic pen 200 to the wireless terminal 100 in operation 512. That is, the operation of maintaining the electronic pen in the area for the period of time may be detected through a signal received from the terminal sensor unit 104 and/or the input unit 101. Furthermore, the touch of the icon indicating the transmission starting position may be detected through a signal received from the input unit 101. Moreover, maintaining the electronic pen 200 at the position of the selected file for the period of time while pressing the key added to the electronic pen 200 and then releasing the key input may be detected through a signal from the terminal sensor unit 104 and/or the input unit 101.

When the reception is requested, the terminal controller 111 proceeds to operation 514 to receive the selected data from the electronic pen 200 and display an effect of receiving the data from the electronic pen 200 on the display unit 102.

In order to display such an effect, a data transmission rate may be displayed, the received data may be displayed through a process opposite to that illustrated in FIGS. 4A and 4B, or an auditory effect, such as a sound of water drops, may be used. Moreover, these methods may also be jointly used.

Figure 7:
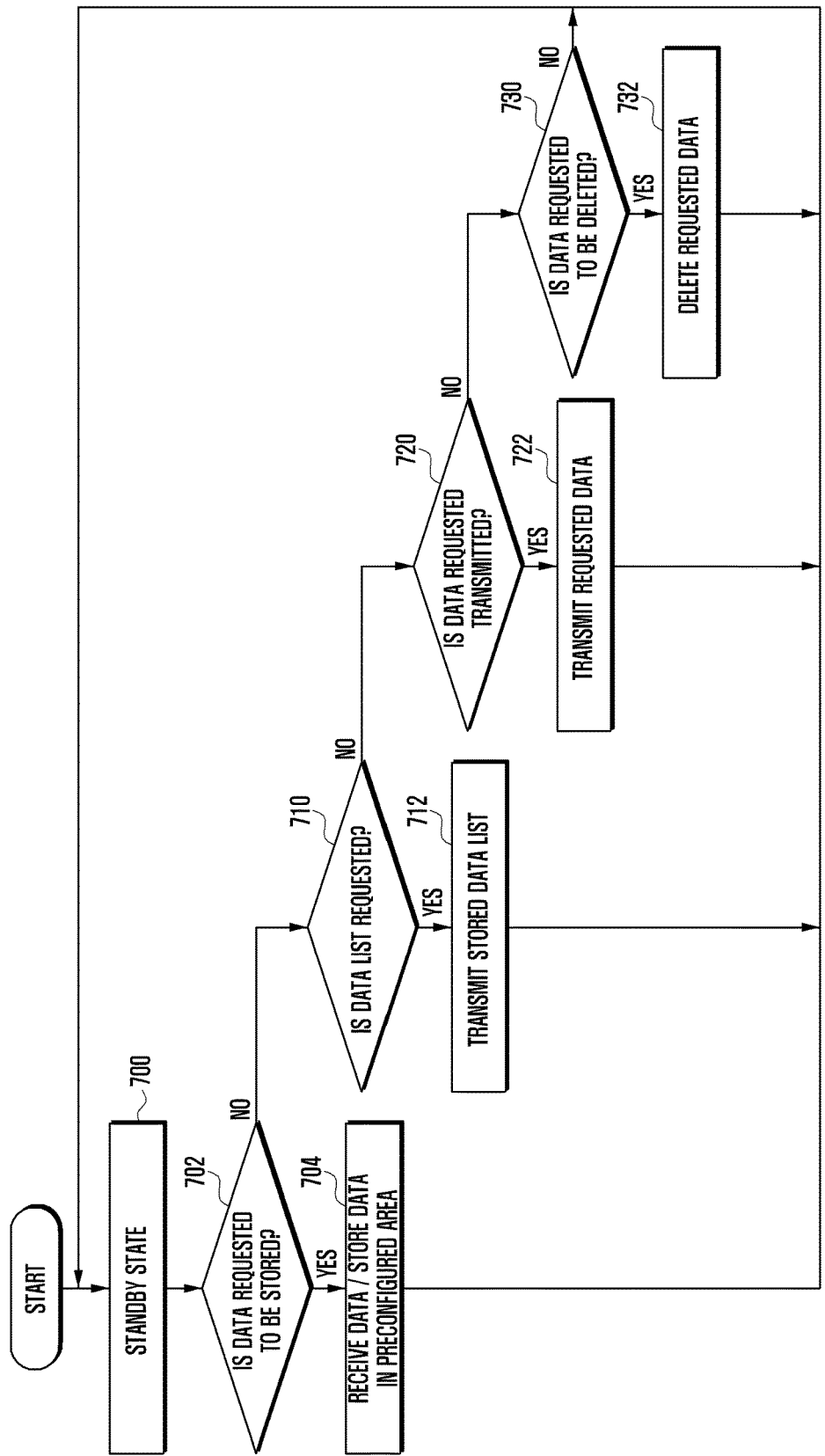
FIG. 7 is a flowchart illustrating a control flow for data transmission/reception and data processing in the electronic pen according to an embodiment of the present disclosure.

FIG. 7 is a flowchart illustrating a control flow for data transmission/reception and data processing in the electronic pen according to an embodiment of the present disclosure.

Referring to FIG. 7, the electronic pen controller 211 is maintained in a standby state in operation 700. Here, the standby state implies a step for standing ready for receiving a specific signal from the electronic pen wireless unit 202 or receiving an input of the key added to the electronic pen, by the electronic pen controller 211, in a state in which a user moves the electronic pen 200 to a position close to the wireless terminal 100. When the key input signal is received from the key input unit 201 or the specific signal is received from the electronic pen wireless unit 202, the electronic pen controller 211 proceeds to operation 702.

In operation 702, the electronic pen controller 211 determines whether specific data is requested to be stored. Namely, as in the case of the aforementioned control flow of FIG. 2, a determination is made as to whether specific data is transmitted from the wireless terminal 100 to the electronic pen 200 and the specific data is requested to be stored in the electronic pen 200. As a result of the determination in operation 702, if the specific data is requested to be stored in the electronic pen, the electronic pen controller 211 proceeds to operation 704, and if not, the electronic pen controller 211 proceeds to operation 710.

First, in the case of proceeding to operation 704, the electronic pen controller 211 receives the data from the wireless terminal 100 through the electronic pen wireless unit 202, and stores the received data in an area of the electronic pen memory 204. More specifically, the electronic pen controller 211 down-converts, demodulates, and decodes the received data, and provides the decoded data to the electronic pen controller 211. The electronic pen controller 211 accordingly stores the received data in the area of the electronic pen memory 204. At this time, in a case where a storage area is insufficient for the electronic pen memory 204, the electronic pen controller 211 may inform the wireless terminal 100 of the deficiency in storage area, and may overwrite infrequently used data area or the oldest data area among the pre-stored data area.

When informing the wireless terminal 100 of the deficiency in storage area of the electronic pen memory 204, the electronic pen controller 211 may configure overwriting of data, deletion of pre-stored data prior to data transmission, or cancellation of data transmission.

Meanwhile, when proceeding from operation 702 to operation 710, the electronic pen controller 211 determines whether data received from the electronic pen wireless unit 202 requests a list of data stored in the electronic pen memory 204. As a result of the determination in operation 710, if the list of the data stored in the electronic pen memory 204 is requested, the electronic pen controller 211 proceeds to operation 712, and if not, the electronic pen controller proceeds to operation 720.

When proceeding to operation 712, the electronic pen controller 211 reads the list of the data stored in the electronic pen memory 204. At this time, the electronic pen controller 211 may also read preview data of the data stored in the electronic pen memory 204 together with the list if necessary.

In operation 712, the electronic pen controller 211 reads the data stored in the electronic pen memory 204 and then controls the electronic pen wireless unit 202 to transmit the read data to the wireless terminal 100. More specifically, the electronic pen controller 211 reads the data stored in the electronic pen memory 204 and processes the read data into a transmittable form for the wireless terminal 100. Thereafter, the electronic pen controller 211 controls the electronic pen wireless unit 202 to encode, modulate, and up-convert the processed data and transmit the up-converted data to the wireless terminal 100.

When proceeding from operation 710 to operation 720, the electronic pen controller 211 determines whether the data received from the electronic pen wireless unit 202 requests transmission of specific data. As a result of the determination in operation 720, if the transmission of the specific data is requested, the electronic pen controller 211 proceeds to operation 722, and if not, the electronic pen controller 211 proceeds to operation 730.

When proceeding to operation 722, the electronic pen controller 211 reads the transmission-requested data from the electronic pen memory 204 and processes the read data into a transmittable form for the wireless terminal 100. Thereafter, the electronic pen controller 211 controls the electronic pen wireless unit 202 to encode, modulate, and up-convert the processed data and transmit the up-converted data to the wireless terminal 100. At this time, after the transmission-requested data is completely transmitted, deletion of the data may also be requested. Namely, a data movement may be requested from the electronic pen 200 to the wireless terminal 100. In this case, the electronic pen controller 211 may delete the transmitted data from the electronic pen memory 204.

Meanwhile, when proceeding from operation 720 to operation 730, the electronic pen controller 211 determines whether deletion of specific data is requested. As a result of the determination in operation 730, if the deletion of the specific data is requested, the electronic pen controller 211 proceeds to operation 732 to delete the requested data from the electronic pen memory 204. At this time, deletion of two or more pieces of data may be requested, and the electronic pen controller 211 may delete all the deletion-requested data at one time.

As described above, according to the present disclosure, a user can transmit data stored in the wireless terminal 100 to the electronic pen 200 as if collecting a liquid through a pipette. Furthermore, the user can transmit the data stored in the electronic pen 200 to the wireless terminal 100 as if dropping a liquid out of the pipette.

Accordingly, the user can transmit the data stored in one wireless terminal to another wireless terminal using an electronic pen, and can move or transfer data between wireless terminals using only an electronic pen without carrying the wireless terminal itself, thereby enhancing user convenience.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of transmitting/receiving data to/from an electronic pen by a wireless terminal, the method comprising:
    displaying an icon for each of a transmission mode of the wireless terminal and a reception mode of the wireless terminal;
    receiving a button press input from the electronic pen indicating a selection of the icon for the transmission mode or the icon for the reception mode;
    in response to a determination by the wireless terminal that the transmission mode has been selected by the button press input:
    displaying a transmission list that is to be transmitted when data transmission to the electronic pen is requested after an approach of the electronic pen is detected,
    configuring transmission data by data selected from displayed data in the transmission list, when a selection request signal is detected, and
    transmitting the configured transmission data to the electronic pen when transmission of the configured transmission data is requested, the configured transmission data being transmitted when it is detected that the electronic pen is moved away from the wireless terminal in the vertical direction; and
    in response to a determination by the wireless terminal that the reception mode has been selected by the button press input:
    requesting reception list data stored in the electronic pen,
    receiving a selection of a reception list from a plurality of reception lists stored on the electronic pen, the plurality of reception lists displayed for selection by a user, and
    displaying the reception list data when receiving the reception list data from the electronic pen, wherein preview data of data stored in the electronic pen is received and displayed on the wireless terminal prior to receiving the reception list data from the electronic pen.

2. The method of claim 1, further comprising:
outputting a transmission sound effect for informing of the data transmission when transmitting the configured transmission data to the electronic pen.

3. The method of claim 1, further comprising:
modifying the displayed data to a shape in which the displayed data is absorbed into the electronic pen, in accordance with a data transmission rate by which the configured transmission data is transmitted.

4. The method of claim 1, wherein the selection request signal comprises one of a touch by the electronic pen and a touch by a user.

5. The method of claim 1, further comprising:
requesting, when at least one of the reception list data is selected and requested to be received, the electronic pen to transmit the selected data and receiving the selected data.

6. The method of claim 5, further comprising:
when receiving the selected data from the electronic pen, displaying the received data.

7. The method of claim 5, further comprising:
outputting a reception sound effect for informing of reception of the selected data from the electronic pen when receiving the selected data.

8. The method of claim 5, further comprising:
sequentially displaying the received data to inform of reception of the selected data from the electronic pen when receiving the selected data.

9. The method of claim 5, wherein the selecting of the selection list data is performed using one of a touch by the electronic pen and a touch by a user.

10. A wireless terminal device for transmitting/receiving data to/from an electronic pen, the wireless terminal device comprising:
a sensor configured to detect an approach and a key input signal of the electronic pen;
an input device configured to detect and output a touch input, a touch and drag or a key input of a user, or hovering or a hovering movement of the electronic pen;
a transceiver configured to transmit/receive data to/from the electronic pen in a frequency band;
a memory configured to store data;
a display configured to display:
an icon for each of a transmission mode of the wireless terminal device and a reception mode of the wireless terminal device, and
a state of the wireless terminal device, wherein the display is further configured to display at least one of:
data or a transmission data list which is to be transmitted to the electronic pen, or
data or a reception data list which is to be received from the electronic pen; and
at least one processor configured to:
receive a key input signal of the electronic pen indicating a selection of the icon for the transmission mode or the icon for the reception mode, and
in response to a determination by the wireless terminal device that the transmission mode has been selected by the button press input:

read a transmission list, which is to be transmitted, from the memory when data transmission to the electronic pen is requested after an approach of the electronic pen is detected by the sensor,
control the display to display the transmission list,
configure data selected from displayed data in the transmission list as transmission data when a selection request signal is detected, and
control the transceiver to transmit the configured transmission data to the electronic pen when transmission of the configured transmission data is requested, the configured transmission data being transmitted when it is detected that the electronic pen is moved away from the wireless terminal device in the vertical direction,
in response to a determination by the wireless terminal that the reception mode has been selected by the button press input:
control the transceiver to request reception list data stored in the electronic pen,
control the transceiver to receive a selection of a reception list from a plurality of reception lists stored on the electronic pen, the plurality of reception lists displayed for selection by a user, and
control the display to display the reception list data when the reception list data is received from the electronic pen,
wherein preview data of data stored in the electronic pen is received and displayed on the wireless terminal prior to receiving the reception list data from the electronic pen.

11. The wireless terminal device of claim 10, wherein the at least one processor outputs a transmission sound effect for informing of the data transmission when transmitting the transmission data to the electronic pen, or modifies the displayed data to a shape in which the displayed data is absorbed into the electronic pen and displays the modified data in response to a data transmission rate when transmitting the configured transmission data.

12. The wireless terminal device of claim 10, wherein the selection request signal comprises one of a touch by the electronic pen and a touch by a user.

13. The wireless terminal device of claim 10, wherein the at least one processor is configured to:
control, when at least one of the reception list data is selected and requested to be received, the transceiver to request the electronic pen to transmit the selected data and to receive the selected data.

14. The wireless terminal device of claim 10, wherein in response to transmitting the configured transmission data to the electronic pen the transceiver receives a notification of insufficient storage from the electronic pen.

15. The wireless terminal device of claim 10, wherein in response to receiving the configured transmission data from the wireless terminal device, the electronic pen determines that there is insufficient storage for the configured transmission data.

16. The wireless terminal device of claim 15, wherein in response to the determination that there is insufficient storage, the electronic pen is configured to perform at least one of overwriting infrequently used data or overwriting oldest data.

* * * * *